United States Patent
Choi et al.

(10) Patent No.: US 10,574,104 B2
(45) Date of Patent: Feb. 25, 2020

(54) ROTOR OF MOTOR

(71) Applicant: HA NAM ELECTRICITY CO., LTD., Gwangju (KR)

(72) Inventors: Young Gun Choi, Gwangju (KR); Jin Won Chae, Gwangju (KR); Jun Hyeok Jang, Gwangju (KR)

(73) Assignee: HA NAM ELECTRICITY CO., LTD., Gwangju (KR)

( * ) Notice: Subject to any disclaimer, the term of this patent is extended or adjusted under 35 U.S.C. 154(b) by 349 days.

(21) Appl. No.: 15/541,475

(22) PCT Filed: Jan. 14, 2016

(86) PCT No.: PCT/KR2016/000390
§ 371 (c)(1),
(2) Date: Jul. 4, 2017

(87) PCT Pub. No.: WO2016/114600
PCT Pub. Date: Jul. 21, 2016

(65) Prior Publication Data
US 2018/0006514 A1   Jan. 4, 2018

(30) Foreign Application Priority Data
Jan. 15, 2015   (KR) ........................ 10-2015-0007241

(51) Int. Cl.
*H02K 1/27*   (2006.01)
*H02K 15/03*   (2006.01)
(Continued)

(52) U.S. Cl.
CPC ........... *H02K 1/278* (2013.01); *H02K 1/2733* (2013.01); *H02K 1/28* (2013.01); *H02K 15/03* (2013.01); *H02K 41/031* (2013.01); *H02K 15/12* (2013.01)

(58) Field of Classification Search
CPC ................................................. H02K 1/278
See application file for complete search history.

(56) References Cited

U.S. PATENT DOCUMENTS 9,048,715 B2 *   6/2015   Kodani ................ H02K 1/2733
2005/0104467 A1 *   5/2005   Corengia ................ H02K 1/278
                                              310/156.28
(Continued)

FOREIGN PATENT DOCUMENTS

CN   102835008 A   12/2012
CN   103219813 A   7/2013
(Continued)

OTHER PUBLICATIONS

International Search Report for PCT/KR2016/000390 dated Apr. 25, 2016 from Korean Intellectual Property Office.

*Primary Examiner* — Robert W Horn
(74) *Attorney, Agent, or Firm* — Revolution IP, PLLC

(57) ABSTRACT

A rotor of a motor according to the present invention comprises: a shaft; a rotor core having a shaft insertion hole, into which the shaft is inserted and coupled; a magnet coupled to the outer peripheral surface of the rotor core; and a rotor cover comprising an upper cap and a lower cap, which cover the upper and lower portions of the rotor core and of the magnet, respectively, wherein the outer periphery of the rotor core comprises a first corner portion and a second corner portion, and the inner periphery of the magnet comprises a first inner peripheral portion, which corresponds to the first corner portion, and a second inner peripheral portion, which corresponds to the second corner portion.

4 Claims, 4 Drawing Sheets

(51) Int. Cl.
  *H02K 1/28* (2006.01)
  *H02K 41/03* (2006.01)
  *H02K 15/12* (2006.01)

(56) References Cited

U.S. PATENT DOCUMENTS

| | | | | |
|---|---|---|---|---|
| 2007/0210663 A1* | 9/2007 | Kalavsky | | H02K 1/278 |
| | | | | 310/156.19 |
| 2008/0278018 A1* | 11/2008 | Achor | | F02M 37/08 |
| | | | | 310/156.12 |
| 2008/0307635 A1* | 12/2008 | Marioni | | H02K 1/278 |
| | | | | 29/598 |
| 2012/0313463 A1* | 12/2012 | Howell | | H02K 1/278 |
| | | | | 310/43 |
| 2013/0026862 A1 | 1/2013 | Brandau et al. | | |
| 2013/0049493 A1* | 2/2013 | Zhao | | H02K 1/2773 |
| | | | | 310/43 |
| 2013/0187487 A1 | 7/2013 | Honda et al. | | |
| 2015/0028709 A1* | 1/2015 | Ueda | | H02K 1/2706 |
| | | | | 310/156.19 |
| 2015/0061444 A1* | 3/2015 | Kamiya | | H02K 1/278 |
| | | | | 310/156.12 |
| 2016/0065016 A1* | 3/2016 | Seufert | | H02K 1/16 |
| | | | | 310/156.08 |
| 2017/0054334 A1* | 2/2017 | Binder | | H02K 1/02 |
| 2017/0093233 A1* | 3/2017 | Li | | H02K 29/03 |
| 2017/0358963 A1* | 12/2017 | Lim | | H02K 5/128 |
| 2017/0366076 A1* | 12/2017 | Kikuchi | | B62D 5/04 |
| 2017/0373564 A1* | 12/2017 | Heiden | | H02K 11/028 |
| 2018/0006514 A1* | 1/2018 | Choi | | H02K 15/03 |
| 2018/0097413 A1* | 4/2018 | Sun | | H02K 1/278 |
| 2018/0097414 A1* | 4/2018 | Kalluf | | H02K 1/278 |
| 2018/0123436 A1* | 5/2018 | Liang | | H02K 1/278 |
| 2018/0294685 A1* | 10/2018 | Ryu | | H02K 1/276 |
| 2018/0331589 A1* | 11/2018 | Bott | | H02K 1/278 |
| 2019/0028007 A1* | 1/2019 | Ma | | H02K 1/278 |
| 2019/0068013 A1* | 2/2019 | Kim | | B62D 5/0403 |
| 2019/0074739 A1* | 3/2019 | Brookes | | H02K 1/2753 |
| 2019/0140529 A1* | 5/2019 | Kawamoto | | H02K 1/278 |
| 2019/0150309 A1* | 5/2019 | Eddison | | H05K 5/064 |
| | | | | 310/45 |

FOREIGN PATENT DOCUMENTS

| | | |
|---|---|---|
| JP | 1987-166755 A | 7/1987 |
| JP | 06-178477 A | 6/1994 |
| JP | 1994-048381 U | 6/1994 |
| JP | 1996-280145 A | 10/1996 |
| JP | 2001-298887 A | 10/2001 |
| JP | 2002-361678 A | 12/2002 |
| JP | 2003-037953 A | 2/2003 |
| JP | 2006-320141 A | 11/2006 |
| JP | 2013-150494 A | 8/2013 |
| KR | 20-0214716 Y1 | 12/2000 |
| KR | 20-0214716 Y1 | 2/2001 |
| KR | 10-2013-0086176 A | 7/2013 |
| KR | 10-2013-0103313 A | 9/2013 |
| KR | 10-1303009 B1 | 9/2013 |
| KR | 10-1363231 B1 | 2/2014 |

\* cited by examiner

[Fig. 1]
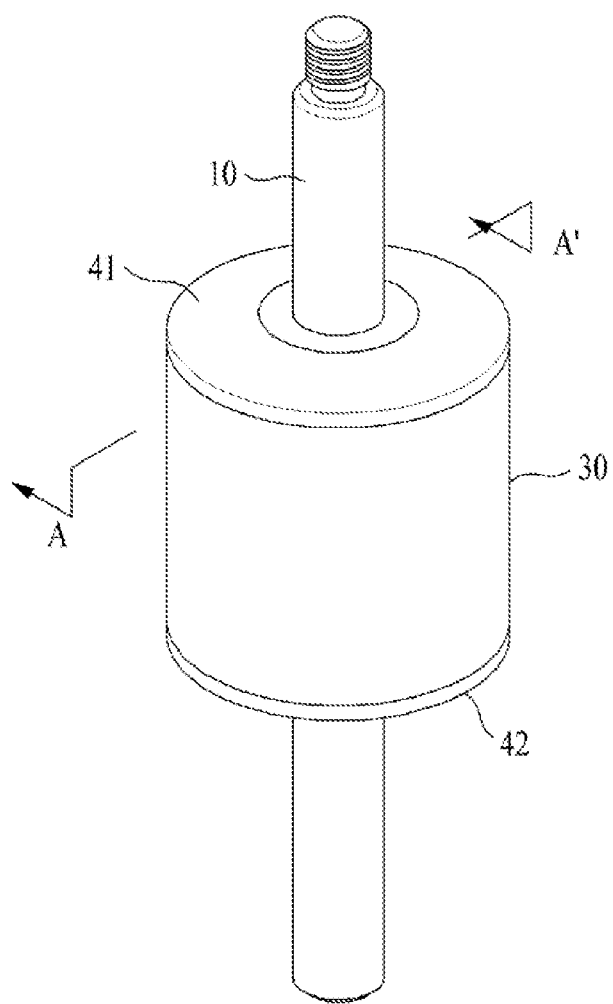

[Fig. 2]
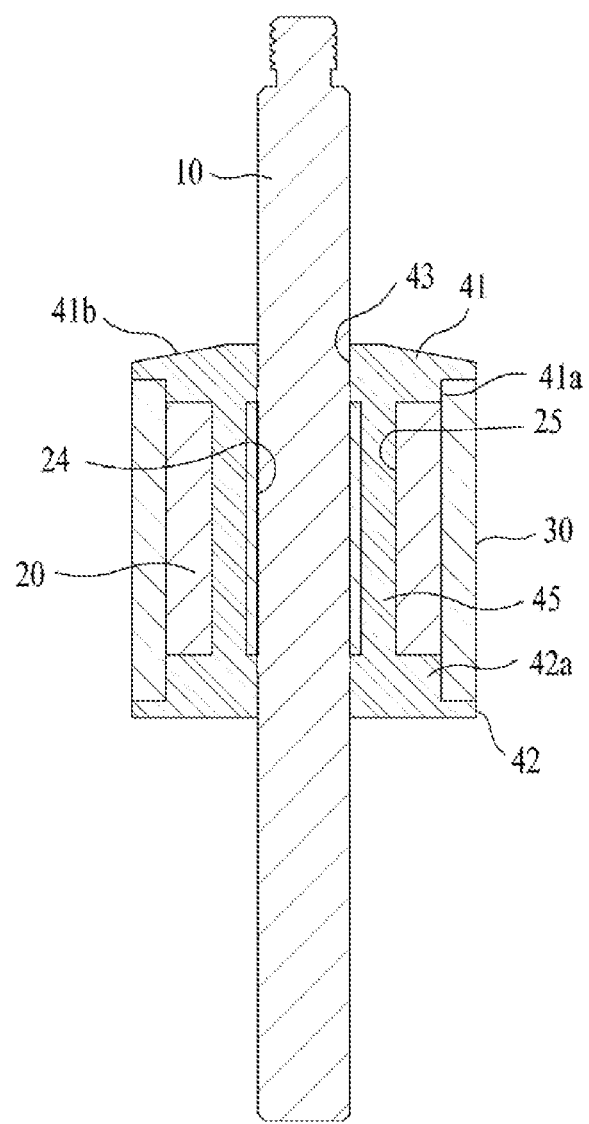

[Fig. 3]
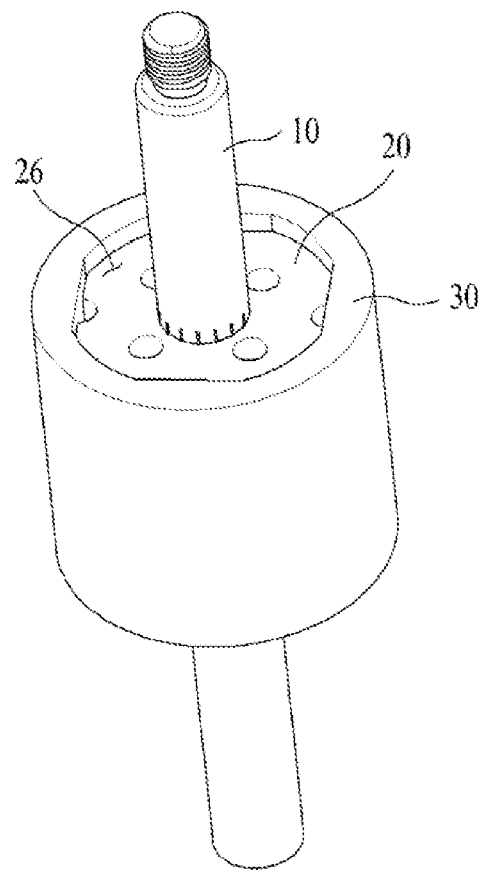
[Fig. 4]
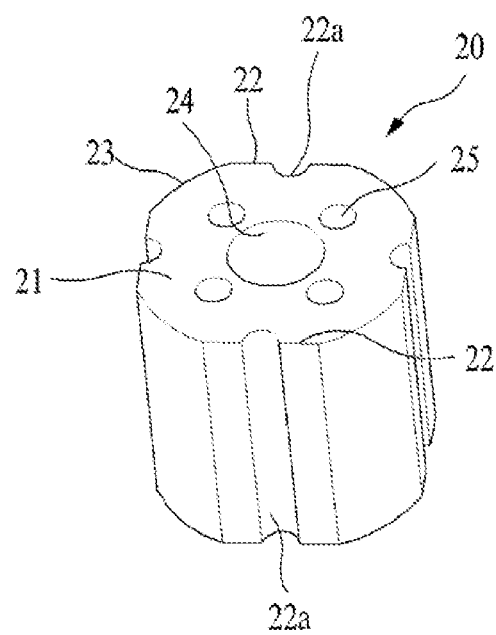

[Fig. 5]
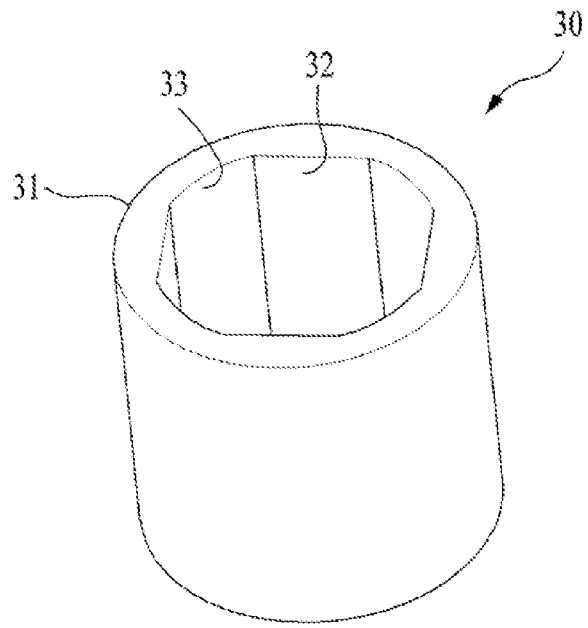
[Fig. 6]
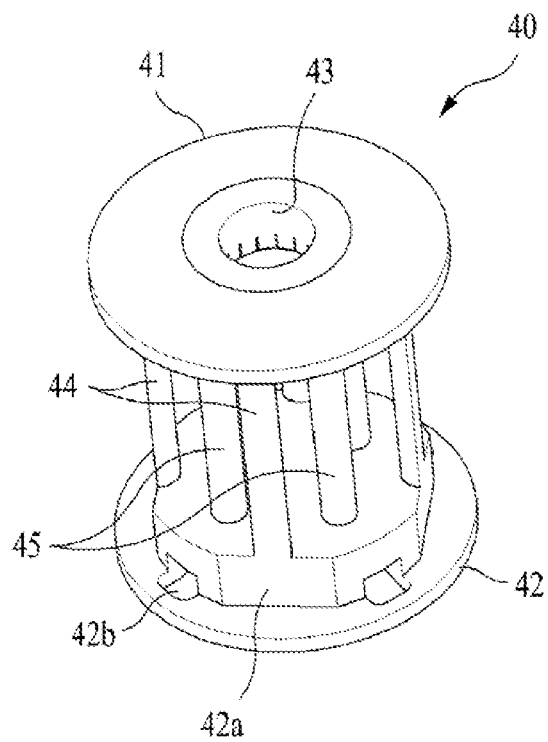

ROTOR OF MOTOR

CROSS REFERENCE TO PRIOR APPLICATIONS

This application is a National Stage Application of PCT International Patent Application No. PCT/KR2016/000390 filed on Jan. 14, 2016, under 35 U.S.C. § 371, which claims priority to Korean Patent Application No. 10-2015-0007241 filed on Jan. 15, 2015, which are all hereby incorporated by reference in their entirety.

TECHNICAL FIELD

The present invention relates to a rotor of a motor. More specifically, the present invention relates to a rotor of a motor with a simple manufacturing process and a structure where the magnet and the rotor core can be firmly coupled to each other.

BACKGROUND ART

In general, a rotor of a motor is a component placed facing a stator, which rotates being affected by the change of magnetic field. Such rotor comprises a shaft which rotates, a rotor core and a magnet.

The rotor applied to a conventional motor is manufactured by a method which attaches a plurality of magnets on the surface of the rotor core to which a shaft is coupled in the center portion by an adhesive. However, in case of manufacturing a rotor core by this method, there is a disadvantage that the manufacturing time is long because time is required to completely harden the adhesive for attaching the magnet. Also, in case the rotor rotates at a high speed, there is a problem that the magnet deviates from its original location.

In order to solve this problem, Korean Patent No. 10-1303009 discloses a structure which applies a fixed body for fixing a magnet as a portion that plays the role of a rotor core, and manufacturing this fixed body by an insert injection of a mixed resin of metal powder and thermoplastic resin and applying it to the rotor.

However, in order to manufacture the property of the mixed resin to replace the rotor core, the material cost for said structure increases to that extent. Also, as to the structure of fixing the magnet, the magnet and the fixed body are separated from each other, thus causing the magnet to run idle. Further, when applied to electric equipment such as a vacuum cleaner, due to a gap formed between the fixed body and the magnet by the pressure of air continuously introduced to an upper portion of the rotor, the magnet would run idle even harder.

In order to solve the above problems, the present inventors suggest a rotor with a new structure.

DETAILED DESCRIPTION

Technical Task

It is an object of the present invention to provide a rotor of a motor which can prevent the magnet from being separated or running idle when the rotor rotates by being manufactured by insert injection molding.

It is another object of the present invention to provide a rotor which has a simpler manufacturing process and thus could lower the manufacturing cost, and a manufacturing method thereof It is yet another object of the present invention to provide a rotor which has a structure that can prevent the magnet from being separated by continuously introducing the air introduced from the upper portion of the rotor towards the inside of the rotor.

The above objects and other inherent objects of the present invention can all be achieved by the present invention explained below.

Means for Solving the Technical Task

A rotor of a motor according to the present invention comprises: a shaft; a rotor core having a shaft insertion hole, into which the shaft is inserted and coupled; a magnet coupled to an outer peripheral surface of the rotor core; and a rotor cover comprising an upper cap and a lower cap, which cover the upper and lower portions of the rotor core and of the magnet, respectively, wherein the outer periphery of the rotor core comprises a first corner portion and a second corner portion, and the inner periphery of the magnet comprises a first inner peripheral portion, which corresponds to the first corner portion, and a second inner peripheral portion, which corresponds to the second corner portion.

In the present invention, preferably, the upper cap and the lower cap may be connected by a first upper portion and lower portion connector which is formed along a side surface groove formed on the outer periphery surface of the rotor core.

In the present invention, preferably, the upper cap and the lower cap may be connected by a second upper portion and lower portion connector which is formed along an inner hole formed around the shaft insertion hole of the rotor core.

In the present invention, the upper cap may have an upper inclined surface with a height which gets shorter from the center of the shaft towards the outer side.

In the present invention, preferably, the height of the rotor core may be formed to be shorter than the height of the magnet, so that an upper stepped portion which is a space forming a step with the upper portion of the magnet is formed on the upper portion of the rotor core and a lower stepped portion which is a space forming a step with the lower portion of the magnet is formed on the lower portion of the rotor core, thereby having an upper supporting portion of the rotor cover formed and coupled to the upper stepped portion and a lower supporting portion of the rotor cover formed and coupled to the lower stepped portion.

A method for manufacturing a rotor of a motor according to the present invention comprises: coupling a shaft to a center of a rotor core; coupling a cylindrical magnet to an outer periphery surface of the rotor core; placing in an insert injection mold in a state having the rotor core and the magnet coupled; and forming a rotor cover formed in the upper and lower portions of the magnet by insert injection.

Effect of Invention

The present invention has an effect of providing a rotor that has a structure which can prevent the magnet from being separated or running idle when the rotor rotates by being manufactured by insert injection molding, can lower the manufacturing cost for having a simpler manufacturing process, and can prevent the magnet from being separated by continuously introducing air introduced from the upper portion of the rotor towards the inside of the rotor, and a manufacturing method thereof.

BRIEF DESCRIPTION OF DRAWINGS

FIG. 1 is a perspective view illustrating a rotor of a motor according to the present invention;

FIG. 2 is a cross-sectional view taken along line A-A' of FIG. 1;

FIG. 3 is a perspective view illustrating a state where a rotor cover is removed from a rotor of a motor according to the present invention;

FIG. 4 is a perspective view illustrating a rotor core applied to a rotor of a motor according to the present invention;

FIG. 5 is a perspective view illustrating a magnet used in a rotor of a motor according to the present invention; and FIG. 6 is a perspective view illustrating only a rotor cover portion formed in a rotor of a motor according to the present invention by insert injection.

Hereinafter, the present invention will be explained in more detail with reference to the attached drawings.

BEST MODE FOR CARRYING OUT THE INVENTION

FIG. 1 is a perspective view illustrating a rotor of a motor according to the present invention. FIG. 2 is a cross-sectional view taken along line A-A' of FIG. 1.

As illustrated in FIGS. 1 and 2, a rotor of a motor of the present invention comprises a shaft 10, a rotor core 20, a magnet 30 and a rotor cover 40 comprising an upper cap 41 and a lower cap 42.

A shaft 10 is insertedly coupled to a shaft insertion hole 24 of the rotor core 20, thereby rotating together with the rotor core 20. In the present invention, a core body 21 of the rotor core 20 may be a core of a layered type which has a plurality of thin metal steel plates layered, and may be manufactured by die-casting a magnetic body. Also, other magnetic bodies may be applied by being manufactured in different forms.

Preferably, a magnet 30 has a cylindrical shape, and is fittedly coupled to an outer periphery surface of the rotor core 20. A rotor cover 40 comprises an upper cap 41 which covers an upper portion of the rotor core 20 and the magnet 30, and a lower cap 42 which covers a lower portion thereof. The upper cap 41 and the lower cap 42 are connected to each other by a first upper portion and lower portion connector 44 and/or a second upper portion and lower portion connector 45 and forms one member. Said rotor cover 40 is made of a material such as an insulating plastic resin by insert injection.

While the shaft 10 is coupled to the shaft insertion hole 24 of the rotor core 20, and the magnet 30 is coupled to the outer periphery surface of the rotor core 20, a rotor cover 40 comprising the shape of an upper cap 41 and a lower cap 42 is manufactured by injecting a resin melt by the insert injection. An upper supporting portion 41a which is formed in a stepped portion between the upper portion of the rotor core 20 and the upper portion of the magnet 30 is formed in a lower portion of the upper cap 41. An upper inclined surface 41b that has an inclined shape which gets shorter from the center of the circle towards the outer side is formed in an upper portion of the upper cap 41. By inducing the air introduced from the upper portion towards the outer side of the rotor by the upper inclined surface 41b, it became possible to prevent the bordering surface where the rotor core 20, the magnet 30 or the rotor cover 40 is coupled from being separated or damaged by the pressure of the air. A lower supporting portion 42a which is formed in a stepped portion between the lower portion of the rotor core 20 and the lower portion of the magnet 30 is formed in an upper portion of the lower cap 42.

FIG. 3 is a perspective view illustrating a state where a rotor cover 40 is removed from a rotor of a motor according to the present invention.

Referring to FIG. 3, with regard to the rotor according to the present invention, a magnet 30 is forcibly inserted and coupled to the outer periphery surface of the rotor core 20 coupled to the shaft 10. After being placed in an insertion injection mold as illustrated in FIG. 3, a resin melt is injected into the mold to manufacture the shape of the rotor cover 40.

FIG. 4 is a perspective view illustrating a rotor core 20 applied to a rotor of a motor according to the present invention.

As illustrated in FIG. 4, the rotor core 40 according to the present invention has a cylindrical shape where four parts on the circumference are cut. That is, the plane view of the rotor core 20 has a shape where arcs in the portions at 0, 180, 90, 270 degrees are cut in a shape symmetrical to each other. The straight line part cut is a first corner portion 22 and the portion with an arc not cut is a second corner portion 23. A shaft insertion hole 24 coupled to the shaft 10 is formed penetrating the center of the rotor core 20, and a plurality of inner holes 25 are formed along the shaft insertion hole 24. In FIG. 4, 4 inner holes 24 are formed, but the number of inner holes 24 is not necessarily limited to 4, and 2, or 3, 5 or more may be applied. In this case, preferably, each inner hole 25 is placed symmetrical to each other in consideration of the rotation balance of the rotor.

A side surface groove 22a is formed on the first corner portion 22. As the resin melt is filled along the side surface groove 22a, a first upper portion and lower portion connector 44 of the rotor cover 40 is formed. The first upper portion and lower portion connector 44 plays the role of preventing the magnet 30 from running idle with the rotor core 20 and increasing the coupling force of the rotor cover 40. In FIG. 4, the side surface groove 22a is formed on the first corner portion 22, but the side surface groove 22a may also be formed on the second corner portion 23, not on the first corner portion 22.

FIG. 5 is a perspective view illustrating a magnet 30 used in a rotor of a motor according to the present invention.

Referring to FIG. 5, the magnet 30 of the present invention has a cylindrical shape. The outer side is a cylindrical outer periphery portion 31 which has a circular shape, and the inner side has a first inner periphery portion 32 and a second inner peripheral portion 33, which are shapes corresponding to the first corner portion 22 and the second corner portion 23 of the rotor core 20. The first inner periphery portion 32 corresponds to the first corner portion 22, and the second inner periphery portion 33 corresponds to the second corner portion 23. The corresponding portions are inserted into each other and coupled, so as to prevent the magnet 30 from running idle on the outer periphery surface of the rotor core 20. Preferably, the height of the magnet 30 is formed to be greater than the height of the rotor core 20. Therefore, when the magnet 30 and the rotor core 20 are coupled to each other, an upper stepped portion 26 and a lower stepped portion 27 are formed on the upper and lower portions thereof, respectively.

FIG. 6 is a perspective view illustrating only a rotor cover 40 formed in a rotor of a motor according to the present invention by the insert injection.

As illustrated in FIG. 6, the rotor cover 40 of the present invention comprises an upper cap 41, a lower cap 42, a shaft coupling portion 43, and first and second upper portion and lower portion connectors 44 and 45.

The upper cap 41 and the lower cap 42 are formed to cover an upper portion of the rotor core 20 and the magnet 30, thereby preventing the magnet 30 from being separated in the upper and lower direction. The shaft coupling portion 43 plays the role of surrounding the upper and lower portions of the shaft 10 portion coupled to the rotor core 20, and increases the coupling force with the shaft 10.

The first upper portion and lower portion connector 44 is formed along a side surface groove 22a formed on an outer periphery surface of the rotor core 20. The first upper portion and lower portion connector 44 plays the role of increasing the coupling force between the rotor core 20 and the rotor cover 40 while increasing the coupling force with the magnet 30, and preventing the magnet 30 from running idle.

The second upper portion and lower portion connector 45 is formed along an inner hole 25 inside a rotor core 20, and effectively prevents the magnet 30 from being separated in the upper and lower direction by firmly maintaining the coupling force of the upper cap 41 and the lower cap 42 of the rotor cover 40.

A resin melt injected into an upper stepped portion 26 formed on the upper portion of a rotor core 20 and a magnet 30 coupled to each other is formed with an upper supporting portion 41a. Likewise, a resin melt injected into a lower stepped portion 27 formed on the lower portion of a rotor core 20 and a magnet 30 coupled to each other is formed with a lower supporting portion 42a. The upper supporting portion 41a and the lower supporting portion 42a are coupled to allow the rotor core 20 to be stably located. Preferably, a plurality of lower opened portions 42b formed in the same shape are formed on locations symmetrical to one another in one portion of the lower supporting portion 42a. The rotor cover 40 may implement a stable shape by injecting the resin melt into the portion where the lower opened portion 42b is located at the time of the insert injection.

Although the detailed description of the present invention is explained in the above with reference to embodiments, the embodiments are merely examples for understanding the present invention, and do not limit the scope of the present invention. The scope of the present invention is defined by the appended claims, and it should be understood that simple variations or modifications within the scope of the claims fall within the scope of the present invention.

What is claimed is:

1. A rotor of a motor, comprising:
   a shaft;
   a rotor core having a shaft insertion hole, into which the shaft is inserted and coupled;
   a magnet coupled to an outer peripheral surface of the rotor core; and
   a rotor cover comprising an upper cap and a lower cap, which cover upper and lower portions of the rotor core and of the magnet, respectively,
   wherein the outer periphery of the rotor core comprises a first corner portion and a second corner portion, and the inner periphery of the magnet comprises a first inner peripheral portion, which corresponds to the first corner portion, and a second inner peripheral portion, which corresponds to the second corner portion,
   wherein the height of the rotor core is formed to be shorter than the height of the magnet, so that an upper stepped portion which is a space forming a step with the upper portion of the magnet is formed on the upper portion of the rotor core and a lower stepped portion which is a space forming a step with the lower portion of the magnet is formed on the lower portion of the rotor core, thereby having an upper supporting portion of the rotor cover formed and coupled to the upper stepped portion and a lower supporting portion of the rotor cover formed and coupled to the lower stepped portion.

2. The rotor of a motor of claim 1, wherein the upper cap and the lower cap are connected by a first upper portion and lower portion connector which is formed along a side surface groove formed on the outer periphery surface of the rotor core.

3. The rotor of a motor of claim 2, wherein the upper cap and the lower cap are connected by a second upper portion and lower portion connector which is formed along an inner hole formed around the shaft insertion hole of the rotor core.

4. The rotor of a motor of claim 1, wherein the upper cap has an upper inclined surface with a height which gets shorter from a center of the shaft towards the outer side.

* * * * *